(12) United States Patent
Crockett et al.

(10) Patent No.: US 6,519,530 B2
(45) Date of Patent: Feb. 11, 2003

(54) INTELLIGENT REMOTE LOCATION SYSTEM

(75) Inventors: Patrick W. Crockett, Chapel Hill, NC (US); William E. Thacker, Durham, NC (US)

(73) Assignee: eWatchdogs, Inc., Jacksonville, FL (US)

( * ) Notice: Subject to any disclaimer, the term of this patent is extended or adjusted under 35 U.S.C. 154(b) by 0 days.

(21) Appl. No.: 09/930,060

(22) Filed: Aug. 15, 2001

(65) Prior Publication Data

US 2002/0042278 A1 Apr. 11, 2002

Related U.S. Application Data

(60) Provisional application No. 60/225,472, filed on Aug. 15, 2000.

(51) Int. Cl.[7] .................................................. G06G 7/78
(52) U.S. Cl. ........................................ 701/300; 340/989
(58) Field of Search .......................... 701/300; 709/203, 709/1; 340/988, 989, 992; 379/106.02

(56) References Cited

U.S. PATENT DOCUMENTS 5,553,609 A  * 9/1996 Chen et al. .................. 128/630

* cited by examiner

*Primary Examiner*—Yonel Beaulieu
(74) *Attorney, Agent, or Firm*—Arthur G. Yeager (57) ABSTRACT

A remote location system for communicating location information between a movable remote location device that generates such location information and a location service includes at least one remote location device having detecting means for determining a location of a remote location device, communication capability for communicating the location information to the service and from the service to a user of the service, and intelligent location agent means in the form of algorithms for selectively defining location information in terms of location event data to be communicated to the locator service. The intelligent location agent algorithms define location event data to include a remote locator device crossing a specified boundary as established by the location service; traveling a specified distance from a prior location; and exceeding a specified velocity.

29 Claims, 1 Drawing Sheet

INTELLIGENT REMOTE LOCATION SYSTEM

CROSS-REFERENCE TO RELATED APPLICATIONS

This application is related to provisional application, Serial No. 60/225,472 filed Aug. 15, 2000, entitled "INTELLIGENT REMOTE LOCATION SYSTEM", and is related to two U.S. Patent Applications each filed on Jul. 18, 2001 entitled "COMMUNICATION PROTOCOL FOR A REMOTE LOCATOR SYSTEM", Serial No. 09/907,801 and entitled "TIGHTLY COUPLED REMOTE LOCATION DEVICE UTILIZING FLEXIBLE CIRCUITRY", Ser. No. 09/907,800.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention pertains generally to communication systems, and more particularly to a communication system, which utilizes an intelligent location agent to provide, on demand, the current locations of one or more remote location devices as well as sets of past locations of the devices.

2. Related Art

In many fields of human endeavor it is useful to know the precise geographic location of a person or object. For example, if an individual were mentally handicapped, it would be desirable to continuously know the individual's exact whereabouts in order to ensure his or her well-being. Similarly, it would be useful to know in real time the location of a delivery person in the field so that more efficient delivery scheduling may be accomplished. A multitude of other applications for geographic location information can be found in the commercial sector, civilian agencies, law enforcement agencies, and the military., With the arrival of the Global Positioning System (GPS), which provides three-dimensional coordinates of any location on earth, such remote locator systems have become a practicality.

What is needed is a system (hardware, software, protocols) that provides, on demand, the current locations of one or more remote location devices as well as sets of past locations of the devices. The past locations should be selected according to intelligent algorithms so as to deliver only useful information and to minimize memory requirements. The system should also be able to initiate alerts based upon the current location of the devices and the intelligent location algorithms.

BRIEF SUMMARY OF THE INVENTION

In one aspect of the present invention there is provided a remote location system for communicating location information between a movable remote location device that generates such location information and a location service comprising at least one remote location device having detecting means for determining a location of the remote location device, communication means for communicating the location information to the service and from the service to a user of the service, and intelligent location agent means for selectively defining the location information in terms of location event data to be communicated to the locator service. The communication means includes a communication protocol for communicating with a remote location device and includes a computer system for communicating with a remote locator device by way of the protocol. The communication means also includes user communication modes for communication between a user and the service. The modes include service-initiated communication from the service to a user. The communication means further includes protocols for controlling communication between the service and a user. The communication means includes software for integrating communication between the service and a remote locator device and between a user and the service.

The intelligent location agent means defines location event data to include a remote locator device crossing a specified boundary as established by the location service. The intelligent location agent means can also define location event data to include a remote location device traveling a specified minimum distance from a prior location as established by the location service and to define location event data to include a remote locator device exceeding a specified velocity as established by the location service.

In other aspects of the present invention there is provided a remote location system for communicating location information between a movable remote location device that generates such location information and a location service comprising a plurality of remote location devices each having detecting means for determining the location of the remote location device, communication means for communicating the location information to the location service from each remote location device and from the location service to a user of the location service, and program means for selectively defining the location information in terms of location event data to be communicated to the location service and under what circumstances the data is communicated from the service to a user of the service. The communication means includes a communication protocol for communicating with each remote location device and a computer system for communicating with each remote locator device by way of the protocol. The communication means also includes user communication modes for communication between a user and the location service and service-initiated communications from the location service to a user. The communication means includes software protocols for controlling communication between the location service and a user and includes human operator protocols for controlling communication between the location service and a user.

The program means defines location event data to include a remote locator device crossing a specified boundary as established by the location service; a remote location device traveling a specified minimum distance from a prior location as established by the location service; and a remote locator device exceeding a specified velocity as established by the location service.

Another aspect of the present invention provides a remote location system for communicating location information between a movable remote location device that generates such location information and a location service comprising at least one remote location device having detecting means for determining a location of a remote location device identified by the system and memory for storing the location information, communication means for communicating the location information to the location service and from the service to a user of the location service, and intelligent location agent means for selectively defining the location information in terms of location event data to be communicated to the locator service. The intelligent location agent means includes at least one location algorithm for selecting which location data is to be stored in the memory of the remote locator device. The location algorithm is for minimum distance sampling whereby the current location is recorded only when the distance from the most recently recorded location to the current location is at least as much as some prescribed distance; for fixed time interval sampling whereby the current location is recorded only when a prescribed amount of time has passed since the most recently recorded location; and for velocity-determined sampling whereby the rate that the locations are recorded depends on the velocity of a remote location device.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawings, in which:

DETAILED DESCRIPTION OF THE INVENTION

Definitions

A remote location system consists of one or more remote location devices, a protocol for communicating with the remote location devices, and a service (protocol, software, and hardware) for delivering location information (from the location devices) on demand.

A remote location device is an electronic assembly that has a means for establishing its location and an ability to communicate that location to a querying agent at another location.

Purpose

Figure 1:
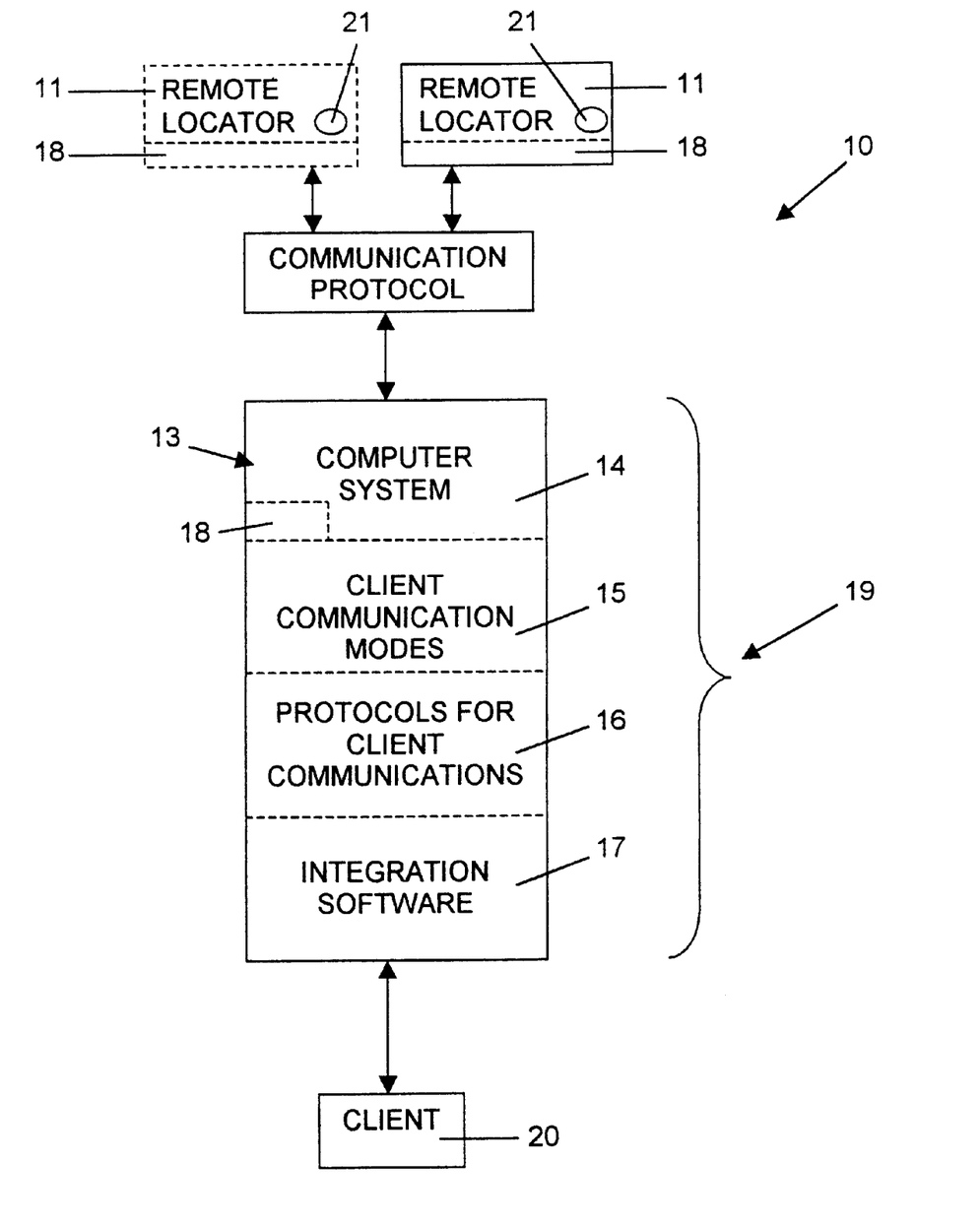
The sole figure is a block diagram of the system in accord with the present invention.

This invention is a system that provides, on demand, the current locations of one or more remote location devices as well as sets of past locations of the devices. The sets of past locations may be selected according to an intelligent algorithm so as to avoid inundating the user with trivial data and so as to minimize memory requirements. The system 10 may initiate alerts based upon the current location of the device 11 and the intelligent location capability.

Parts—The intelligent location system 10 has four parts as shown in the figure.

1. The remote location devices 11,
2. The protocol for communicating with the remote location devices (communication protocol) 12,
3. The delivery service 13, and
4. The intelligent location agent 18.

Descriptions and examples of remote location devices 11 may be found in Appendix 2.

A description of the protocol for communication with remote location devices 12 is in Appendix 3.

The delivery service 13 consists of:

a) A computer system 14, which is capable of communicating with the remote location devices 11 through the communication protocol 12. The computer system 14 may be distributed across multiple physical locations or may be in a single site. In this context, "computer system" includes hardware (including, but not limited to, CPU, peripheral devices such as modems, network interface cards, data storage devices, and a console and other input and output devices) and operating software (including, but not limited to, an operating system and device controllers).

b) One or more client communication modes 15. Example client (or end user) communication modes 15 include (but are not limited to):

i. Internet access (including world wide websites), ii. telephone call centers (including automated voice response systems, human operators, and combinations of the two),    iii. local and wide area networks, and    iv. direct console access.

The computer system 14 is preferably capable of initiating communication with clients 20. System-initiated communication modes include (but are not limited to):

i. email messages, ii. fax messages, iii. automated voice phone calls, iv. messages to human operators' monitors directing the operators to make telephone calls.

c) Software and human operator protocols 16 for controlling communication with clients. Functions that may be required of client communication software 16 include (but are not limited to):

i. identify clients (verify account numbers and passwords), ii. verify account status, iii. manage accounts, iv. accept and handle location requests, v. accept and handle changes to smart location parameters, vi. accept and handle requests for historical location data, vii. initialize remote location devices 11, viii. deliver locations to clients (maps, directions, or addresses faxed, e-mailed, or described by operator), and    ix. refine location data (scrolling, zooming, labeling of maps, conversion of measurement units).

Features that may be required of operator protocols 16 include (but are not limited to):

i. specification of information to be acquired from client 20 and order of acquisition,    ii. specification of which operators are allowed access to which data (As examples, the location operators may not be allowed access to identity data, and the account management operators may not be allowed access to current or historical location data).

d) Software for integrating 17 client communication, communication with the remote location devices; and access to necessary data (including, but not limited to data related to states of devices 11, smart location algorithms, and client accounts).

The intelligent location agent 18 is software that allows the location service 19 to be configured with user-specified location events of interest and which determines the location service's responses to the location events.

Examples of location events include (but are not limited to):

Crossing a specified boundary:

1. An amusement park rents remote location devices 11 to customers and wants to know when a device 11 travels more than 10 yards outside of the gates of the park.

2. A pharmaceutical company keeps track of the time the sales force is within physicians' offices (versus traveling between offices) by setting multiple boundaries, one around each physician's office.

3. An alarm installation contractor's employees drive company vans to many small jobs. By setting a boundary around each job site, the contractor is able to precisely monitor time spent on each job.

Traveling a specified minimum distance since the last recorded location event:

4. A person's movements are monitored over the course of a day or a week. It is common for a person to spend lengthy periods in a small location (at home, at the office, at a restaurant, in a grocery store). Only movements from one location to another need to be recorded; continually recording that the person is in the office every two minutes for four hours would waste memory; transmitting the information would waste battery charge. So, a new location and time are recorded only if the location is at least 25 yards away from the most recently recorded location.

Exceeding a specified velocity:

5. A delivery service monitors the speed of each of its vehicles (using elapsed time and distance traveled between locations observed at short time intervals) to ensure that drivers do not exceed legal speed limits.

Examples of responses to location events include (but are not limited to):

1. Send an alert to the client 20 (potentially appropriate for location event examples 1 and 5).

2. Record the event for later download to the client 20 (potentially appropriate for location event examples 2, 3, and 4).

Novel Features—The present invention is the first remote location system to include an intelligent location agent. The intelligent agent allows the system to conserve memory and/or power resources on board the remote locator devices by selectively recording location data. It also allows the system to send alert messages when location events of interest occur, and allows the system's delivery service to present information to the clients in the most useable format (digesting large quantities of location data and presenting useful extracts). Additional features are discussed below.

1. First Embodiment—Personal Locator System

This embodiment is the first remote location system:

To include comprehensive location data (personal, vehicle, goods, etc.) with an intelligent agent.

To-provide multiple client access modes with an intelligent agent.

To provide minimum-distance sampling for recording location events.

To provide velocity-determined sampling for recording events.

2. Second Embodiment—Park Location System

This embodiment is the first park locator system:

To include an intelligent agent 18.

To notify the system owner if a remote location device 11 leaves the park.

To provide location information without the use of permanently installed transmitters.

3. Third Embodiment—Sales Force Location System

This embodiment is the first sales force location system.

To provide real-time data.

To include an intelligent agent 18.

To provide verification that a sales representative has visited a specific client.

To provide differentiation between various internal locations of a client's office.

To provide data on how many clients and of what type are visited on a given day.

To provide data on how much time is spent at each location and in transit.

4. Fourth Embodiment—Delivery Fleet Location System

To provide an intelligent location agent 18.

That can be utilized by a fleet of bicycles.

That can be carried by delivery personnel to provide data on personnel within buildings and at other locations.

SYSTEM DESCRIPTION

Embodiments of the intelligent remote location system 10 include (but are not limited to) the following examples.

Personal Location System

The purpose of this embodiment of the invention is to provide an ability to locate an individual person without the person having to actively participate in the act of location, or to locate valuable goods. The embodiment also provides an ability to track the movements of the person, and provides the person with the ability to send an alarm signal in an emergency.

The remote location devices 11 are small and unobtrusive and may be built with flexible circuitry (Appendix 2). This allows the devices to be conveniently carried on a person or valued pet. Methods of carrying a remote location device 11 include, but are not limited to, the following:

1. The device 11 may be sewn into clothing;
2. The device 11 may be embedded in a watch or watchband or a pet collar;
3. The device 11 may be carried in a wallet or a purse.

The remote location devices 11 may also be inserted into or attached to shipments of valuable goods or attached to a vehicle. Because the device 11 is small and unobtrusive, it should be unnoticed in the event of theft or abduction, allowing the client 20 to locate and recover the person, pet, goods or vehicle. Because the flexible version of the remote location device 11 can be sewn into clothing (or a pet collar), the device will not annoy non-responsible carriers (including, but not limited to, persons with Alzheimer's disease, autistic or very young children, and pets). Thus it is unlikely that a non-responsible carrier will discard the device 11.

The remote location devices 11 use global positioning system (GPS) satellite receivers to determine location and AMPS cellular telephones to communicate with the location system 19. Consequently, the remote location device 11 can determine can determine its position virtually anywhere in the world, and can communicate from any location that has AMPS cellular coverage (including most of North America).

The remote location devices 11 have on-board memory and logic allowing storage of a history of 200 or more locations and times. Part of the intelligent location agent 18 resides in the remote location devices 11—that part which determines whether the device has moved a set distance since the last recorded location. If so, the device 11 will store the current location in memory along with the most recent 199 locations. If the device 11 has not moved far enough to satisfy the algorithm, the current location will be discarded. When the client 20 requests the location of the device 11, the past history will also be available.

Another part of the intelligent location agent 18 resides in the service 19: The client 20 specifies named locations by specifying the centers, radii and names of the locations. (Named locations might include such locations as "home", "school", "mall", "Grandmother's house", etc.) If the remote location device 11 is in one of the named locations when the service 19 delivers the location information, the service 19 will deliver that name as the location.

Clients 20 may access the service 19 through three modes:
1. Automated voice response system,
2. Call center staffed by human operators,
3. World-wide-website.

In each mode, the client 20 first is identified (through account number and password) and then may request: the current location of the remote location device 11 or may request the location history of the device 11 (up to 200 most recently recorded locations and times). The service 19 telephones the remote location device 11 to acquire the requested information and then delivers the information to the client 20. The information may be delivered as named location(s), as a map (via world-wide-web, e-mail or fax), or by a human operator describing a map delivered to the operator's computer display. Through the same access modes, the client 20 may set parameters controlling the intelligent agent 18 (whether to record at specified fixed time intervals or when movement exceeds a specified distance, named location information, etc.).

The remote location device 11 may initiate communication with the remote location service in two circumstances. If the battery is low, the device 11 will call a dedicated phone number to report this fact and download its history of locations before going into a dormant mode. If the panic button on the device 11 is pressed, the device 11 will call a dedicated emergency phone number and the system 19 will initiate a specified emergency procedure (typically a call to 911 in the appropriate jurisdiction and notification of the client 20 that an emergency is in progress).

Remote Location Device 11 (Appendix 2) The components of this embodiment are as follows:

The remote location device 11 is a self-contained unit combining:
1. a battery,
2. global positioning (GPS) antenna and circuitry,
3. cellular telephone antenna and circuitry (AMPS),
4. modem circuitry,
5. on-board memory for storing data for 100 locations (including latitude, longitude, elevation, time, and number of satellites contributing to the location fix),
6. logical processing capability (a CPU).

The remote location device 11 also has a panic button 21 that the carrier may press in an emergency. If the panic button 21 is pressed, the device 11 calls a specified telephone number to inform the location service 19 that an emergency is occurring. The service 19 then alerts the appropriate agency (PSAP and/or the client 20) and requests the device's current location at short intervals until the emergency is over.

The remote location device 11 fixes its location at regular intervals (typically at least once per minute). A sample of these location fixes is saved. The sample is chosen according to an intelligent location algorithm.

To conserve battery power the device 11 checks in with the cellular telephone network less frequently. A typical setting for cellular telephone contact is for the device 11 to advise the network of its presence once every three minutes and to be available to receive calls for 60 seconds after each notification of availability.

If the device's battery level falls below a prescribed level, the device 11 calls a specified primary phone number to inform the service 19 that the battery is low and to download the stored location data. Then the device 11 becomes dormant until the battery is recharged.

Through the location service 19, a client 20 can:
1. request the current location of his device 11,
2. request the stored past locations,
3. instruct the device 11 to store locations either
    a. at fixed time intervals (intervals specified by the user),
    b. as the device 11 moves a fixed distance (distance specified by the user) from the most recently stored location, or
    c. according to other intelligent location algorithms.

When any of these actions is initiated, the service 19 telephones the remote location device 11 through the service's modem and the device's cell phone), issues the instruction or requests the data, receives confirmation and/or data from the device, and then delivers the data to the client 20 in suitable format.

Before a personal location device 11 can be put into service, it must be initialized or registered with the location service 19. This is done via the device's cell phone in a call initiated by the device 11. One mechanism, but not the only mechanism for doing this is for the device 11 to store a logical flag indicating whether it has been initialized. If it has not been initialized, then pressing the panic button will cause the device 11 to place an initialization call to the location service 19.

The device 11 is provided (by its manufacturer) with an electronic serial number (ESN) that is unique to that specific device. The device 11 also knows:
1. whether it has been assigned a mobile identification number (MIN—its cell phone number) and a cellular home system identification number (SID) by a cellular phone service provider,
2. its MIN and SID if they have been assigned,
3. its manufacturer's identification code,
4. its manufacturer's private encryption key (for a public key encryption algorithm),
5. its manufacturer's public encryption algorithm,
6. the service's public encryption (for the public key encryption algorithm),
7. a symmetric key encryption algorithm, the algorithm's identification code, and the device's unique encryption key,
8. the error-detecting algorithm used by the service,
9. the initialization phone number for the service.

Items 1, 2, 3, and 8, the identification code from Item 7, and the ESN are transmitted to the location service during initialization.

The service 19 knows:
1. the public key and encryption algorithm associated with every manufacturer's identification code,
2. The symmetric encryption algorithm associated with every symmetric encryption identification code,
3. primary and secondary phone numbers for the device 11 to call, 4. appropriate, available MIN and SID for the device 11 if these have not already been assigned.

Items 3 and 4 are transmitted to the remote location device 11 during initialization.

Communication Protocol 12 (Appendix 3) Part 1—Initialization The physical communication channel layer is the cellular telephone network and the telephone network between the cellular telephone service provider and the location service's physical location.

The link layer is an onboard modem using a standard low-level modulation protocol such as V.34, V.32bis, V.32, V.22bis, or V.22.

For the initial phase of the initialization call, the encryption/encoding layer will be encryption-null (no encryption, error-detection encoding with the algorithm used by the service). As communication is established and an encryption algorithm is negotiated, the encryption/encoding layer will convert (in stages, as described in the following description of an initialization call) to the agreed upon encryption algorithm. An error in the initialization call will require re-transmission of the block containing the error. After five unsuccessful attempts to transmit a block error-free, the initialization call will be terminated by the service 19.

The content layer consists of the legal instructions and data identified in the following description of an initialization call.

Description of an initialization call Once modem handshaking has been completed, the device 11 will send a four-character device manufacturer identification code (unencrypted). (The four-character length is before encoding for error detection). The manufacturer and the owner of the service 19 will agree upon each manufacturer's identification code in advance. An unrecognized code is an error.

Next the device 11 will send a code identifying a symmetric encryption algorithm and an encryption key. The algorithm code and the key will both be encrypted with a standard public key encryption algorithm (such as PGP) using both the service's public key and the device manufacturer's private key. One encryption algorithm code will specify that no encryption will be used. An unrecognized encryption identification code is an error.

If a symmetric encryption algorithm is specified, it will be used for the remainder of the initialization process.

All data and codes described below are part of the content layer. When the call description says that the device 11 will send a particular code or datum, this means that the code or datum is first encrypted, then encoded for error detection, then modulated, then transmitted.

The device 11 next sends its ESN, and a three-character code identifying the device type. This device type code will allow the protocol to be used for specialized devices (with some standard features disabled or with non-standard features added) as well as for the standard devices. An unrecognized device type code is an error.

The next information the device 11 will send is a code indicating whether the device 11 has already been assigned an SID and an MIN by a cellular phone service provider. If an SID and an MIN have been assigned, the device 11 will also send these numbers to the service 19. An illegal SID or MIN is an error.

The service 19 will respond (using the specified encryption algorithm and key) by sending the device 11 an SID and an MIN (if the device does not already have these), and sending primary and secondary telephone numbers (which the device 11 may use to contact the service for subsequent communication sessions).

The service 19 will then send a call termination code and terminate the call.

In summary, for initialization the device 11 sends the following data to the service 19:

1. Device manufacturer identification code (unencrypted).
2. Symmetric encryption algorithm identification code (using public key encryption).
3. Symmetric encryption key (using public key encryption).
4. ESN (using symmetric encryption).
5. Code identifying device type (using symmetric encryption).
6. Cod indicating whether device has been assigned SID and MTN (using symmetric encryption).
7. (If SID and MIN have been assigned) SID (using symmetric encryption).
8. (If SID and MIN have been assigned) MIN (using symmetric encryption).

The service 19 responds by sending the following data to the device:

9. (If SID and MIN have not been assigned) SID (using symmetric encryption).
10. (If SID and MIN have not been assigned) MIN (using symmetric encryption).
11. Primary telephone number for contacting service (using symmetric encryption).
12. Secondary telephone number for contacting service (using symmetric encryption).

When the initialization call has been successfully completed, the service 19 will call the device 11 and issue each legal instruction and data request (defined below) to test the initialization and will instruct the device 11 to call the primary and secondary phone numbers. If the instruction and data requests are correctly received by the device 11, if the data transmitted by the device are correctly received by the service 19, and if the primary and secondary phone numbers are successfully called by the device 11 within 10 minutes, then the device 11 is initialized. Otherwise the client 20 is notified that initialization failed.

Communication Protocol 12: Part 2—Communicating with an Initialized Personal Location Device.

The physical communication channel layer is the cellular telephone network and the telephone network between the cellular telephone service provider and the location services physical location.

The link layer is an onboard modem using a standard low-level modulation protocol such as V.34, V.32bis, V.32, V.22bis, or V.22.

For calls initiated by the service 19, the encryption/encoding layer will be the symmetric encryption algorithm agreed upon during initialization, and the service's error detecting algorithm. Calls initiated by the device 11 will begin with null-encryption and switch to the agreed-upon symmetric encryption algorithm as soon as the service correctly acknowledges receipt of a registered ESN. Device-initiated calls will use the service's error-detecting algorithm throughout. An error in recognition of the call-initiator (device or service) will require retransmission. After five unsuccessful attempts, the call will be terminated. Other errors will result in a single attempt to retransmit. If retransmission is unsuccessful, the particular request, data transfer, or instruction will be abandoned and the call will continue.

The procedure for re-establishing communication if a call is interrupted before all tasks have been completed (a missing call-terminator code error) is:

1. If a service-initiated communication session is interrupted before the call-terminator is sent and acknowledged, the session will be re-initiated by the service 19.

2. If a device 11 initiated communication session is interrupted before the service 19 has acknowledged the device ESN, the device will re-initiate the session.

3. If a device 11 initiated communication session is interrupted after the service 19 has acknowledged the device ESN, but before the call-terminator is sent and acknowledged, the service 19 will re-initiate the session.

The content layer consists of the instructions and data identified in the following descriptions of calls.

Description of a service-initiated communication call. The service 19 may initiate a call to poll the device 11 for its location (current and/or past), to instruct the device 11 on appropriate time intervals or distance intervals for saving past locations, or to toggle the device 11 between standard and emergency states.

After modem handshaking has been completed, the service 19 will send a signature and the device 11 will acknowledge that the signature is genuine. Then the service 19 will send instruction codes and parameters (where needed) to the device 11 and the device 11 will respond by sending requested data or by acknowledging the instruction (if the instruction is not a request for data). Data, commands, and acknowledgements are all encrypted using the specified symmetric encryption algorithm, and coded using the service's error-detecting algorithm.

The service 19 will send one instruction code and accompanying parameters, wait for the device 11 to send data or acknowledgement, and then send the next code and parameters. When all instructions have been send and acted upon, the service 19 will send a code that terminates the session.

The set of instructions and parameters correspond to the entries in Table 1.

TABLE 1

Instruction/Parameter Set for Personal Location System.

| Instruction | Parameters | Action |
| --- | --- | --- |
| Send location | None | Send most recent latitude, longitude, elevation, time of fix, and number of satellites in fix. |
| Send past locations | None | Send latitudes, longitudes, elevations, times, numbers of satellites for all saved locations, starting with the most recent. |
| Send battery status | None | Send status of battery. |
| Set time | Time interval | Acknowledge receipt of interval instruction, set interval of time between saved locations. |
| Set distance interval | Distance Interval | Acknowledge receipt of instruction, set interval of distance between saved locations. |
| Set state | New state (emergency or standard) | Acknowledge receipt of instruction, set state of device. |

Description of a primary device-initiated call—The device 11 initiates a call to the primary phone number to notify the service 19 that the device's battery is low.

After modem handshaking is completed, the device 11 will send its ESN using public-key encryption with the service's public key. If the ESN is properly registered (via initialization), the service 19 will respond by sending the ESN back, encrypted using the symmetric encryption algorithm and key specified when initializing the device.

Next the device 11 will send the latitudes, longitudes, elevations, times, and numbers of satellites for the saved locations, starting with the most recent. When the data has all been sent and received without error, the service 19 will send a code to terminate the communication session.

Description of a secondary device-initiated call—The device 11 initiates a call to the secondary phone number to alert the service that the device 11 carrier has pressed the panic button.

After modem handshaking is completed, the device 11 will send its ESN using public-key encryption with the service's public key. If the ESN is properly registered (via initialization), the service 19 will respond by sending the ESN back, encrypted using the symmetric encryption algorithm and key specified when initializing the device.

Next the device 11 will send the latitude, longitude, elevation, time, and number of satellites for the most recent location. The service 19 will acknowledge, and then the device 11 will await instructions from the service 19. When appropriate, the service 19 will send a code to terminate the session.

Delivery Service—The client 20 may contact the service 13 through any of three modes: automated voice response system, a call center staffed by human operators, or through a world-wide-website. The client 20 is led through the same series of steps in any of the three modes. Each mode implements security through the use of passwords. The world-wide-website uses encryption to provide additional security. When calling operator-staffed call center, the client 20 is first greeted by an automated voice response system, but may opt out of the system (and into the operator queue) at any point.

Call center operators access the software portions of the delivery service 13 through a local or wide area network or via the Internet, using either a traditional client/server model or a web-browser/website model. Call center operators typically do not know the identity of clients 20 they are serving, nor do they know the clients' passwords or contact information. If a client 20 opts to have the operator enter either the account number or the password (rather than doing these through the automated voice response system), the operator will necessarily discover these items, but otherwise the call is anonymous unless the client 20 voluntarily discloses information about his identity.

For account set-up and modification (contact information, billing plan, password choice, etc.), the client 20 uses the world-wide-website or calls an account service representative (who does not have access to any information about the current or past locations of the remote location devices). This separation of access to data (between call center operators and account service representatives) assures confidentiality for those clients 20 who require a high level of security.

Appendix 1 presents a flow diagram for a typical call to the call center to request the current location of a remote location device 11. A request submitted through the automated voice response system or through the world-wide-website follows virtually the same flow, with obvious modifications (for example, data sent to the operator's monitor would instead be sent to the client's web browser, etc.). The following notes clarify some points in the diagrams.

1. The software attempts to contact the remote location device 11 as soon as it has enough information (if the clients' account has good or marginal status). This will reduce waiting time for the client 20 if the client has given the automated voice response system enough information to contact the device 11 before going into the operator queue.

2. If the client 20 determines that an emergency exists, he may request that the automated voice response system promote him to the head of the operator queue.

3. If the client 20 has forgotten his password, a hint will be provided (through any of the three access modes). If he has forgotten his account number, it can be provided by an account service representative (or through the world-wide-website).

4. If an account has marginal status (up to two months in arrears), the service 19 will honor location requests, but the client 20 will be referred to accounting afterward to discuss payment. If an account is more than two months in arrears, its status is bad and location requests will not be honored. The delivery service 19 determines the status of the account before contacting the remote location device 11 to verify good or marginal status.

5. A remote location device 11 may not respond to an attempt to contact it, either because it is not actively listening for a call (to conserve battery charge or because the battery is low) or because it is not in a clear reception area for the cellular phone system. In this case, the system 10 will check for the device 11 in the low-battery database (described below). If the device 11 is in the low-battery database, the client 20 will be asked whether the battery has been recharged since the data was entered into the database. If not, the data from the low-battery database will be given to the client 20.

If the device 11 is not in the low-battery database, or if the client 11 responds that the battery has been recharged, the system 10 will preferably make five attempts to contact the device 11 at 30-second intervals. If none of these attempts are successful, the operator offers the client 20 the option of having the system continue to attempt to contact the device 11 after the client-contact call ends. If the client 20 chooses this option, the system attempts to contact the device 11 as many as six more times at 10-minute intervals (up to six tries at 30-second intervals for each of the six attempts). If contact is successful, a map and contact data (including name if the location is named, otherwise address or latitude and longitude, time, battery status) will be faxed and/or emailed to the client (using default contact information unless the client has specified otherwise in the phone call).

When a remote location device 11 notices that its battery charge is lower than a threshold value, it phones a number dedicated to receiving low-battery notification phone calls. The device 11 then downloads its most recent location and time and its stored history of locations and times. The system 10 puts this information in a low-battery database and sends notification to the client 20 via e-mail, fax, or recorded voice message. The system 10 keeps the location information for a specific remote location device 11 in the low-battery database until the device 11 is successfully contacted again. The client 20 may access the location data for his remote location device 11 at any time during the storage period.

Intelligent Location Agent—Part of the intelligent location agent 18 software is stored in the logic circuitry on board the remote location devices 11 and part is stored within the server of the service 19.

The remote location devices 11 use intelligent algorithms to determine which locations to store in on-board memory, so that the on-board memory is not exhausted by storing redundant data and so that the battery is not exhausted by transmitting redundant data. The device 11 typically will get a fix from the GPS satellites at least once per minute. With an ability to store approximately 200 locations, the device 11 would be able to store only a little over three hours of locations if every fix were saved. For many clients 20, this represents an inadequate span of time.

In most cases, a person's day includes periods of virtually no movement (time in an office or at school) or of fairly regular movement (within a vehicle). Consequently, the remote location device 11 may save a small sample of locations relative to the total number of fixed locations) and still satisfy the clients' needs. The samples are selected according to an intelligent algorithm. The algorithm used by a specific remote location device 11 will depend upon the client's needs.

Examples of intelligent location algorithms available for the remote location device 11 include (but are not limited to):

1. Minimum distance sampling—The current location (and time and number of satellites contributing information to the fix) is recorded if and only if the distance from the most recently recorded location to the current location is at least as much as some prescribed distance. A typical value for the prescribed distance is 25 yards.

2. Fixed time interval sampling—The current location is recorded if and only if a prescribed amount of time has passed since the most recently recorded location. A typical value for the prescribed time is 15 minutes.

3. Velocity-determined sampling—High velocity travel (over 50 mph) is fairly regular in nature (freeway travel with limited exit points, for example). Very low velocities (under 0.5 mph) are often associated with essentially stationary behavior (example: in the office with trips to the restroom or lunch-room). In between (pedestrian to local driving speeds) is the range where location events that interest the client 20 are likely to happen. This algorithm first checks velocity, using distance and time over the past few location fixes. If velocity is high or low, sampling is infrequent (based on elapsed time at high velocity and upon elapsed distance at low velocity). If velocity is intermediate, sampling is more frequent (based upon either elapsed distance, elapsed time, or both).

The part of the intelligent location agent 18 resident in the location service's server controls the ability of the service 19 to deliver locations with client-specified names and boundaries. Through the location service's website, the client 20 may specify locations, using addresses, using latitudes and longitudes, or pointing and clicking on maps generated by the web site. The client 20 supplies names and boundaries for the locations. When the service 19 delivers subsequent location information to the client 20, it first checks the list of named locations for that client 20. If the remote location device 11 is within the boundary of a named location, the device 11 is reported to be in that location. On maps delivered by the service to the client 20, all named locations are highlighted and labeled with their names.

Park Location System—The purpose of this embodiment is to provide locator service to groups and families visiting parks (including, but not limited to, theme parks, natural parks, and historical parks). The embodiment may also be used in other large or obscured venues (including, but not limited to, Olympic games, music/cultural festivals, department stores or shopping malls). The service 19 allows members of a group to find one another after they have been separated. The service 19 is administered by a central authority (owner of the park, concessionaire licensed by the festival organizer,; etc.), who leases the remote location devices 11 to the visitors.

Remote Location Device—The remote location devices 11 are contained in or on wristbands or are cards that can be worn on cords around the neck. To determine their locations, the devices 11 use either GPS technology or triangulation from transmitters placed around the park. The use of GPS technology is particularly attractive for events or for national parks, where installation of transmitters may not be economically justified. The devices contain batteries sufficient for typical visits to the park (a full day). The devices 11 also contain logic circuitry that allows them to determine when they have passed outside the boundaries of the park. The devices 11 may have a serial port to facilitate initiation, or may have initiation information programmed in at the time of manufacture.

Communication Protocol—The communication protocol 12 specifies communication with the remote location devices 11 through wireless transmission (channels include, but are not limited to, cellular telephone network—again attractive for venues which do not justify extensive infrastructure investment—and: spread spectrum radio frequency transmissions). Otherwise, the communication protocol 12 is similar to that of the personal location system, with the addition of a code to be sent at the beginning of the data stream for a secondary device-initiated call. The code identifies whether the call is to inform the service 19 that the user has pressed the panic button 21 or whether the call is to inform that the remote location device 11 has left the park boundaries. Other modifications to the communication protocol are necessary if spread-spectrum transmission is used.

Delivery Service—The location delivery service 13 provides access to visitors through kiosks with display units and input devices (keyboards and pointing devices). The kiosks are in convenient locations around the park. The service 19 also alerts the system owner whenever a remote location device 11 informs it that the device 11 has crossed the boundary of the park.

Intelligent Location Agent—The intelligent location agent 18 resides on-board the remote location devices 11. It consists of a logical description of the boundary of the park and an ability to determine whether any location is within or outside the boundary. When the device 11 determines that it is outside the boundary, it alerts the system owner. This allows recovery of device 11 that visitors have forgotten to return as they leave the park.

Sales Force Location System—A company may be interested in tracking the movements of its sales personnel for a variety of reasons. Sales call schedules can be made more efficient if the company properly analyses data on lengths of sales calls, time spent waiting, time in transit, etc. In some cases, compensation of sales personnel is based in part upon how many sales calls are made, so a company may want independent verification of a sales representative's claims about numbers of calls made. The purpose of this embodiment of the invention is to provide comprehensive data on the movements of members of a sales force.

As a particular example, a pharmaceutical company will typically assign a particular region to a sales representative, and will provide lists of physicians rated according to their value to the company (based upon numbers of prescriptions written, influence over other physicians' prescribing habits, etc.). Sales representatives are expected to make a certain percentage of their calls to the A-listed physicians, a certain percentage to the B-listed physicians, and so on. Compensation is based in part upon how many physicians on each list are called upon during each month. Sales calls are typically of similar duration, but waiting times may vary greatly between physicians.

Remote Location Device—In this example embodiment, the remote location device 11 is a self-contained unit that may be carried with the representative's sales materials (in the sample case, for example) or on the representative's person. The device 11 may be implemented as an independent locator or as a manual locator. The independent locator requires no intervention from the sales representative as the day progresses. With the manual locator, the representative must signal the device 11 (by pushing a button, for example) to have it report or record its position when entering and leaving each physician's office. The device 11 contains a battery with sufficient capacity for a day's travels. Location is determined using GPS circuitry.

For the independent locator, the representative downloads the day's list of physicians' office locations into the remote location device 11 before beginning the day's calls. The device 11 monitors its location (getting fixes at least one per minute) throughout the day. When it passes into or out of a physician's office, the device 11 records the location and time or reports these to the location service.

For the manual locator, when the representative signals the device 11 it records the location and time or contacts the service 19 to report its location.

A remote location device 11 may report each movement into and out of a physician's office in real time (via cellular network), or it may record the locations and times for later transmission (via cellular network, land lines, WAN or LAN) en mass. In the latter case, the device 11 may be plugged into a docking unit for simultaneous recharging of its battery and communication with the service 19.

Communication Protocol—The communication protocol 12 is largely the same as that for the personal location system of the first example embodiment of this invention. One exception is that, for the independent remote locator device 11, the content layer of the protocol includes provision for sending to the device 11 the location information for a set of physicians' offices. Another exception is that the physical channel layer may be the cellular telephone network, land telephone lines, WAN or LAN.

Delivery Service—The location delivery service 13 may be owned and operated by the pharmaceutical company or may be owned and operated by a service vendor. Typically, the service 13 will deliver the collected locations for all of the representatives for the entire month in one or more large file transfers. Sales and marketing researchers may receive all the data, district managers may receive all the data for the representatives in their districts, and accounting may receive only digests of the data (numbers of physicians called upon by each representative, for example). Delivery of the data may be through the Internet or over a LAN or WAN, or the data may be delivered on magnetic or optical media.

Intelligent Location Agent—The intelligent location agent 18 may reside in the delivery service's server or may be distributed between the server and the remote location devices 11. The latter is necessary if the remote location devices 11 store office boundary crossings, and is necessary for independent locators 11 which report crossings in real time.

The agent 18 consists of logical descriptions of the boundaries of physicians' offices and programmed logic with the ability to determine whether a particular location is within a physician's office boundary or whether it is outside of all boundaries. If the remote locator devices 11 report boundary crossings in real time, the intelligent agent 18 must also include the ability to load a particular day's boundaries into a remote location device 11. The agent 18 may be able to distinguish physician's names and other identifying data (medical education number, drug enforcement agency number, etc.) and value to the company with the office locations. The agent 18 may include data analysis capability (OLAP, data mining, etc.).

Delivery Fleet Location System—The purpose of this embodiment of the invention is to provide an ability to determine the locations of each vehicle in a delivery fleet at any time. A fleet manager may be interested in modifying delivery schedules on the fly if important new orders come in after vehicles have been dispatched for the day or if unanticipated traffic problems arise. To alter the schedules, it is necessary to know the current locations of the vehicles and to know which locations on the current schedules have already been visited. The manager may also want to implement more optimal scheduling in the future, or may want to make certain that drivers are conforming to prescribed schedules, routes and speed limits. This embodiment of the invention will provide data to support these needs. The embodiment may be configured to send an alarm to the manager if a driver exceeds a specified speed. If small remote location devices 11 are used (as in the first example embodiment of this invention), this embodiment can be utilized by bicycle delivery services.

Remote Location Device—The remote location devices 11 may be self-contained units containing batteries, or may be built into vehicles and powered by the vehicle electrical systems. The devices 11 contain GPS and cellular telephone circuitry as well as memory and processing circuitry. The devices 11 store, on-board, a history of up to 200 locations, sampled according to an intelligent algorithm (including, but not limited to, those mentioned in the first example embodiment).

Communication Protocol—The communication protocol 12 is largely the same as that for the personal location system of the first example embodiment of this invention. One exception is that, in addition to location, time, and number of satellites contributing data to each fix, the device 11 also computes and stores or transmits velocity (calculated from the current and past locations and times). Another is: that provision is made for the remote location device 11 will accept from the location service 19 a maximum acceptable velocity.

Location Delivery Service—The client communicates with the delivery service 13 through a computer terminal via LAN or WAN or world-wide-website browser and a website. Typically, the service 13 will deliver an entire day's data for all vehicles in the fleet at one time. If a remote location device 11 determines that the vehicle is exceeding the maximum acceptable velocity, it will alert the client 20. The client 20 may query the system 10 at any time for the locations of any or all vehicles. The client 20 may also request a list of all scheduled locations that have already been visited and may request a list of vehicles ordered by current distance from a specified location or ordered by distance from a specified location to nearest point in currently scheduled route.

Intelligent Location Agent—The intelligent agent 18 is distributed between the service 19's server and the remote location devices 11. The devices 11 implement an intelligent sampling algorithm in order to store only useful location data (as in the first example embodiment). They also have an algorithm for determining velocity and for comparing current velocity with a specified maximum acceptable velocity.

The part of the intelligent agent 18 located on the service's server includes the ability to order the fleet's vehicles according current distance from a specified location and according to planned routes' minimum distances to a specified location. The service's server also has software that allows some data analysis (for optimizing future routes) and which assists in determining optimal route changes to accommodate changed road conditions or altered call lists.

A flow diagram of call center flow is attached and incorporated into this application as Appendix 1.

The teachings of the attached Appendix 2 entitled "TIGHTLY COUPLED REMOTE LOCATION DEVICE UTILIZING FLEXIBLE CIRCUITRY" are hereby incorporated into this application as Appendix 2. The device described in Appendix 2 comprises only one possible remote location device, which could be utilized in the remote location system of the present invention.

The teachings of the attached Appendix 3 entitled "COMMUNICATION PROTOCOL FOR A REMOTE LOCATOR SYSTEM" are hereby incorporated into this application as Appendix 3. The protocol described in Appendix 3 comprises only one possible communication protocol, which could be utilized in the remote location system of the present invention.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A remote location system for communicating physical location information between a movable remote location device that generates such location information and a location service comprising at least one remote location device having detecting means for receiving signal information and for computing a physical location of said remote location device, communication means for communicating said location information to said service and from said service to a user of said service, and intelligent location agent means for selectively defining said location information in terms of physical location event data to be communicated to said locator service.

2. The system as defined in claim 1 wherein said communication means includes a communication protocol for communicating with a said remote location device.

3. The system as defined in claim 2 wherein said communication means includes a computer system for communicating with a said remote locator device by way of said protocol.

4. The system as defined in claim 2 wherein said communication means includes user communication modes for communication between a user and said service.

5. The system as defined in claim 4 wherein said modes include service-initiated communication from said service to a user.

6. The system as defined in claim 4 wherein said communication means includes protocols for controlling communication between said service and a user.

7. The system as defined in claim 6 wherein said communication means includes software for integrating communication between said service and a said remote locator device and between a user and said service.

8. The system as defined in claim 1 wherein said intelligent location agent means defines physical location event data to include a said remote locator device crossing a specified boundary as established by said location service.

9. The system as defined in claim 1 wherein said intelligent location agent means defines location-event data to include a said remote location device traveling a specified physical minimum distance from a prior location as established by said location service.

10. The system as defined in claim 1 wherein said intelligent location agent means defines location event data to include a said remote locator device exceeding a specified velocity as established by said location service.

11. A remote location system for communicating physical location information between a movable remote location device that generates such location information and a location service comprising a plurality of remote location devices each having detecting means for receiving signal information and for computing the physical location of a said remote location device, communication means for communicating said location information to said location service from each said remote location device and from said location service to a user of said location service, and program means for selectively defining said location information in terms of physical location event data to be communicated to said location service and under what circumstances said data is communicated from said service to a user of said service.

12. The system as defined in claim 11 wherein said communication means includes a communication protocol for communicating with each said remote location device.

13. The system as defined in claim 12 wherein said communication means includes a computer system for communicating with each said remote locator device by way of said protocol.

14. The system as defined in claim 12 wherein said communication means includes user communication modes for communication between a user and said location service.

15. The system as defined in claim 14 wherein said modes include service-initiated communications from said location service to a user.

16. The system as defined in claim 14 wherein said communication means includes software protocols for controlling communication between said location service and a user.

17. The system as defined in claim 14 wherein said communication means includes human operator protocolis for controlling communication between said location service and a user.

18. The system as defined in claim 11 wherein said program means defines physical location event data to include a said remote locator device crossing a specified boundary as established by said location service.

19. The system as defined in claim 11 wherein said program means defines location event data to include a said remote location device traveling a specified physical minimum distance from a prior location as established by said location service.

20. The system as defined in claim 11 wherein said program means defines location event data to include a said remote locator device exceeding a specified velocity as established by said location service.

21. A remote location system for communicating physical location information between a movable remote location device that generates such location information and a location service comprising at least one remote location device having detecting means for receiving signal information and for computing a physical location of a said remote location device identified by said system and memory for storing said location information, communication means for communicating said location information to said location service and from said service to a user of said location service, and intelligent location agent means for selectively defining said location information in terms of physical location event data to be communicated to said locator service.

22. The system as defined in claim 21 wherein said intelligent location agent means includes at least one location algorithm for selecting which said location data is to be stored in said memory of said remote locator device.

23. The system as defined in claim 22 wherein said at least one location algorithm is for minimum distance sampling whereby the current location is recorded only when the distance from the most recently recorded location to the current location is at least as much as some prescribed distance.

24. The system as defined in claim 22 wherein said at least one location algorithm is for fixed time interval sampling whereby the current location is recorded only when a prescribed amount of time has passed since the most recently recorded location.

25. The system as defined in claim 22 wherein said at least one location algorithm is for velocity-determined sampling whereby the rate that the locations are recorded depends on the velocity of a said remote location device.

26. The system as defined in claim 1 wherein said intelligent location agent means defines physical location event data to include a said remote locator device failing to cross a specified boundary as established by said location service.

27. The system as defined in claim 1 wherein said intelligent location agent means defines location event data to include a said remote location device failing to travel a specified physical minimum distance from a prior location as established by said location service.

28. The system as defined in claim 11 wherein said program means defines physical location event data to include a said remote locator device failing to cross a specified boundary as established by said location service.

29. The system as defined in claim 11 wherein said program means defines location event data to include a said remote location device failing to travel a specified physical minimum distance from a prior location as established by said location service.

* * * * *